United States Patent [19]

Ebeling

[11] Patent Number: 5,116,393

[45] Date of Patent: May 26, 1992

[54] ABSORBER FOR DEHYDRATING GAS WITH LIQUID DESICCANT

[76] Inventor: Harold O. Ebeling, 4718 S. Lewis Ct., Tulsa, Okla. 74105

[21] Appl. No.: 738,827

[22] Filed: Aug. 1, 1991

[51] Int. Cl.$^5$ .................. B01D 47/14; B01D 47/12
[52] U.S. Cl. ........................ 55/229; 55/233; 55/257.1; 261/114.2
[58] Field of Search ............ 55/29, 32, 229, 233, 55/234; 261/114.2

[56] References Cited

U.S. PATENT DOCUMENTS

| | | | |
|---|---|---|---|
| Re. 24,433 | 2/1958 | Lavery | 55/32 X |
| 1,770,658 | 7/1930 | Kremser | 261/114.2 |
| 2,136,139 | 11/1938 | Kühni | 261/114.2 |
| 2,804,935 | 9/1957 | Hutchinson | 55/229 X |
| 2,812,827 | 11/1957 | Worley et al. | 55/32 |
| 2,990,910 | 7/1961 | Kimmell | 55/32 |
| 3,651,617 | 3/1972 | Hodgson | 55/32 |
| 4,375,977 | 3/1983 | Honerkamp et al. | 55/234 |
| 4,432,779 | 2/1984 | Honerkamp et al. | 55/233 |
| 4,455,157 | 6/1984 | Honerkamp et al. | 55/234 |
| 4,661,130 | 4/1987 | Ebeling et al. | 55/234 |

FOREIGN PATENT DOCUMENTS 1005854 3/1983 U.S.S.R. ............ 55/233

Primary Examiner—Robert Spitzer
Attorney, Agent, or Firm—Head and Johnson

[57] ABSTRACT

An improved absorber for contacting gas having water entrained therein with a liquid desiccant the absorber being in the form of an upright vessel having a generally horizontal partition dividing the vessel interior into a treating zone and a collection zone. The partition has a collection bucket therein providing a reservoir below the level of the partition and the partition has small diameter opening spaced from the collection bucket. An upright tubular riser is positioned within the vessel treating zone having an open bottom extending within the partition bucket. A desiccant circulation conduit is in the upper portion of the treating zone for dispersing fresh liquid desiccant into the vessel. Packing is positioned within the vessel treating zone. Liquid desiccant filters downwardly through the packing as gas passing upwardly through the partition small diameter openings and upwardly through the desiccant flooded packing wherein water entrained in the gas is absorbed by the desiccant, the gas, being substantially free of water, pass out of the vessel at the upper end of the upper zone. A desiccant distribution conduit passes desiccant out of the bucket and into the vessel collection zone where the desiccant, having water absorbed therein, is removed from the vessel. In an alternate embodiment a second partition divides the vessel in second treating zone and a second collection zone both spaced above the first mentioned treating and collection zones. Liquid desiccant collected in the second cllection zone is passed downwardly into the first mentioned treating zone.

17 Claims, 4 Drawing Sheets

ABSORBER FOR DEHYDRATING GAS WITH LIQUID DESICCANT

SUMMARY OF THE INVENTION

This disclosure relates to an improved apparatus for extracting water from wet gas to provide, at the outlet, gas substantially free of water. The disclosure is particularly applicable to the processing of natural gas having entrained water of sufficient quantity to make its transportation and storage difficult. The absorber to be herein described is of the type adaptable to be located at a point adjacent the area where gas is produced and collected and for removing entrained water from the gas so that the gas can be more economically and efficiently transported, stored, processed and used.

The improved absorber of this disclosure uses the well-known method of extracting water from gas with liquid desiccant, usually glycol. The process is sometimes referred to as "glycol dehydration" or "liquid desiccant dehydration" in which wet gas is mixed with and/or contacted with glycol or some other liquid desiccant. The desiccant absorbs water from the gas but does not absorb the gas. The desiccant, usually glycol, is then heated to evaporate the water from it and the anhydrous glycol is recirculated through the absorber in a continuous process.

The improved absorber of this disclosure provides a system in which gas is intimately contacted with the desiccant for more improved extraction of water in a vessel utilizing minimal components for economy of construction and maintenance. The absorber herein described has the characteristic of accepting a wide range of flow rates and is particularly useful for accepting relatively low flow rates.

The improved absorber of this disclosure is formed of an upright vessel having a generally horizontal partition therein dividing the vessel interior into a treating and a collection zone. The vessel has a gas inlet and a desiccant outlet in the collection zone. In the treating zone the vessel has a gas outlet and a desiccant inlet.

The horizontal partition (also sometimes referred to as a "tray") has a collection bucket as a part thereof. The collection bucket is in the form of a recess portion in the horizontal partition, the bucket having a bottom that is at a lower elevation than the partition. The bucket forms a collection area within the vessel treating zone where glycol, having water absorbed therein, collects.

An upright tubular riser is positioned within the vessel. The riser has an open bottom and an open top. The bottom of the riser extends within the collection bucket with the bottom of the riser spaced above the bucket floor.

A desiccant circulation conduit connects the interior of the upper portion of the riser with the vessel collection zone. In one embodiment the desiccant circulation conduit is exterior of the riser and extends through an opening in the vessel wall treating zone and an opening in the vessel wall collection zone so that desiccant flows upwardly within the riser and out of the riser through the desiccant circulation conduit into the vessel collection zone where it is removed through the desiccant outlet.

In another embodiment the desiccant circulation conduit extends vertically within the riser through an opening in the floor of the collection bucket and into the collection zone. The vertical desiccant circulation conduit is open at each end so that the desiccant flows upwardly within the riser to enter the circulation conduit. The desiccant then flows downwardly through the circulation conduit into the vessel collection zone where the spent desiccant is removed.

Packing is positioned within the vessel treating zone supported on the partition.

A desiccant distribution pipe is mounted within the vessel treating zone in communication with the desiccant inlet. Anhydrous desiccant, that is, desiccant that is substantially free of water, enters the desiccant distributor pipe where it is discharged downwardly onto the packing. The desiccant trickles downwardly through the packing and encounters gas flowing upwardly therethrough so that the desiccant absorbs water from the gas. The gas passes upwardly through the packing wherein substantially all of the water entrained therein is absorbed and passes out of the vessel through the gas outlet in the upper end of the treating zone.

The horizontal partition has a plurality of small diameter openings therein spaced from the collection bucket. Mounted in each of the openings is a short length vertical tubular member that extends upwardly into the treating zone. Positioned over each of the tubular members is a bubble cap. The internal diameter of the bubble cap is greater than the tubular member external diameter, providing an annular area within the bubble cap. Each bubble cap has passageways below the upper end of the tubular member. Gas, having water entrained therein, flows into the vessel through the gas inlet opening and enters the vessel collection zone. The gas then passes upwardly through the short length tubular members into the interior of the bubble caps and then out of the bubble caps through the passageways therein. The gas then flows upwardly through the packing as previously described.

An alternate embodiment of the absorber includes a second generally horizontal partition spaced above the first partition. The second partition divides the vessel interior into a second treating zone and, below that and above the first treating zone, a collection zone. The desiccant distribution pipe is mounted within the second treating zone in communication with the desiccant inlet.

The second horizontal partition, or tray as it is sometimes called, has a collection bucket as a part thereof of the type described with reference to the first mentioned horizontal partition. Further, the second horizontal partition has a plurality of small diameter openings spaced away from the collection bucket. Mounted in each of the openings in a short vertical tubular member that extends upwardly within the second treating zone. Positioned over each of the tubular members is a bubble cap in the same manner as is described with reference to the first horizontal partition.

A second upright tubular riser is positioned within the vessel second treating zone. The riser has an open bottom and an open top, and the bottom of the riser extends within the collection bucket portion of the second horizontal partition. A second desiccant circulation conduit connects the interior of the upper portion of the second riser with the vessel second collection zone. Liquid desiccant flows into the upper portion of the upper treating zone and downwardly through the second treating zone which is filled with packing, into the collection bucket of the second partition, upwardly into the second riser and into the desiccant distribution pipe where it is passed downwardly into the second collection zone and into the first mentioned desiccant distribution pipe. Here the liquid desiccant is again discharged into the interior of the vessel to flow downwardly through the first treating zone to the first partition collection bucket where it passes upwardly into the first tubular riser and downwardly through the desiccant distribution pipe into the first collection zone. Liquid desiccant having water absorbed therein is removed from the first collection zone for recycling. The gas having water entrained therein passes into the interior of the vessel in the first collection zone, upwardly through the first partition into the first treating zone which is filled with packing and upwardly through such packing into the second collection zone. From the second collection zone the gas passes upwardly through the second partition and through packing in the second treating zone. The gas continues to the upper end of the second treating zone where the gas passes out of the vessel through the gas outlet.

The alternate embodiment thus replicates the basic concept of the absorber into a vertical tandem arrangement for improved contact of liquid desiccant with the gas being treated. The alternate embodiment, while more expensive to manufacture, (having more components) is capable of accepting gas at a wider range of flow rates than is characteristic of absorbers presently used.

A better understanding of the invention will be had by reference to the following description of the preferred embodiments and the claims, taken in conjunction with the attached drawings.

DESCRIPTION OF THE DRAWINGS

FIG. 5 does not show the packing so as to reveal more details of the internal construction of the absorber.

DESCRIPTION OF THE PREFERRED EMBODIMENT

Figure 1:
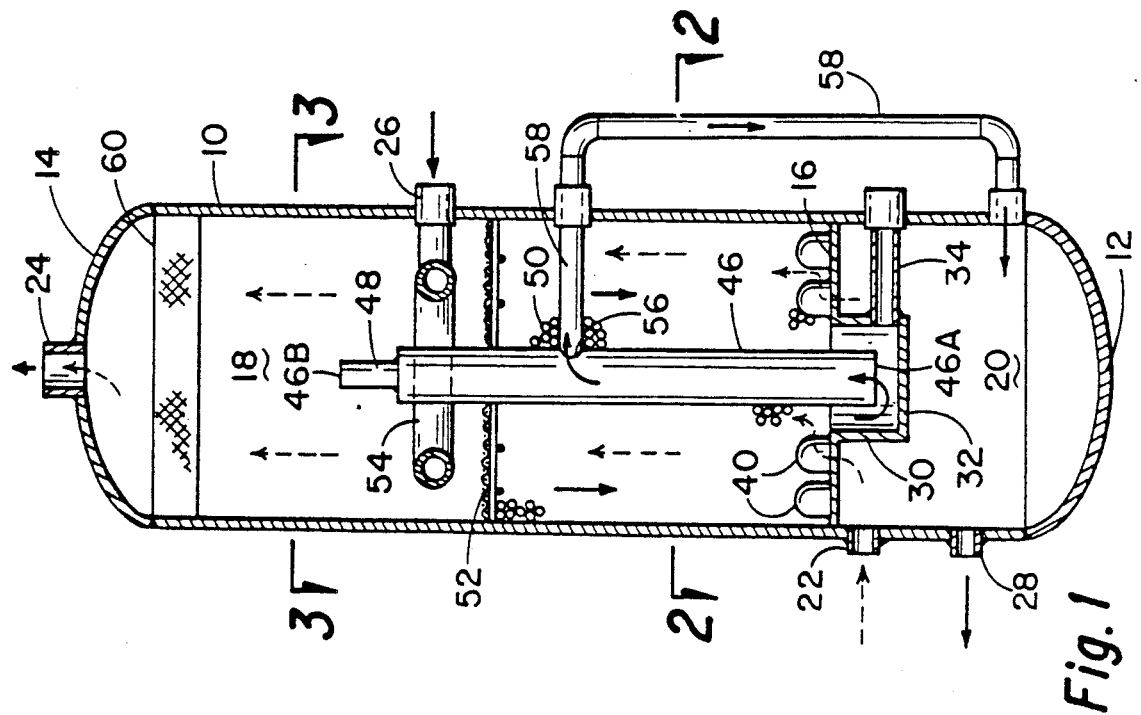
FIG. 1 is an elevational cross-sectional view of the improved absorber of this disclosure for use in dehydrating gas.

Referring to the drawings and first to FIG. 1, a first embodiment of the improved absorber of this disclosure is shown. The absorber is formed by an upright vessel 10 having a bottom 12 and a top 14. Positioned within the vessel is a horizontal partition 16, which in the trade may be referred to as a "tray" or "plate element". The horizontal partition 16 divides the vessel into a treating zone 18 and a collection zone 20, the treating zone being larger than the collection zone.

Formed in the vessel is a gas inlet 22 that communicates with the vessel collection zone 20. A gas outlet 24 is provided in vessel top 14 and communicates with treating zone 18. The gas passing into vessel 10 typically has water vapor entrained therewith that is characteristic of gas flowing from formations in the earth. It is important that the water be substantially removed to facilitate transportation and processing of the gas. Water entrained in gas is highly deleterious. The water tends to collect in flow lines and forms hydrates that can block the lines. In cold weather collected water freezes to cause blockage problems. Further, the entrained water interferes with processing and use of the gas. For these various reasons, it is important that as much of the water as is practically possible be removed from the gas as early as possible in the gas handling processes. Thus, vessel 10 is of the type that may be located in a gas field, adjacent gas producing wells and is normally used for treating the gas before it is introduced into pipelines for further distribution.

The gas is dehydrated in vessel 10 by contact with a liquid desiccant, such as glycol. The anhydrous liquid desiccant is conveyed into the vessel through desiccant inlet 26 and the spent or wet desiccant is removed from the vessel through desiccant outlet 28 that communicates with vessel collection zone 20.

An important feature of the absorber of FIG. 1 is the provision in the horizontal partition 16 of a collection bucket 30. The bucket is preferably centrally positioned in partition plate 16 and is preferably formed integrally with it as illustrated. Collection bucket 30 has a bottom floor 32 that is elevationaly positioned below horizontal partition 16. The collection bucket 30 provides a collection point for spent glycol in a manner to be described subsequently.

Communicating with collection bucket 30 is a cleanout conduit 34. is provided merely as a means of cleaning the interior of the collection bucket. Conduit 34 extends through the wall of vessel 10 but does not form a part of the gas flow or liquid desiccant flow arrangement within the vessel.

Figure 2:
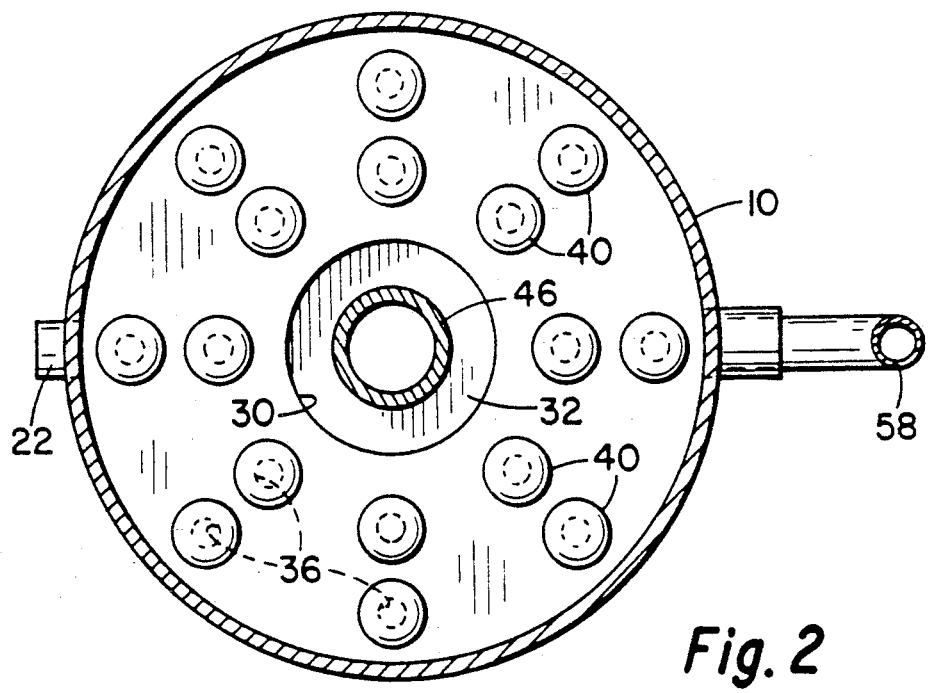
FIG. 2 is a cross-sectional view taken along the line 2—2 of the absorber of FIG. 1 showing the riser, the collection bucket in the partition and the bubble caps. Packing which ordinarily would be seen in FIG. 2 is not shown so as to reveal the details of the other features of the absorber.
Figure 5:
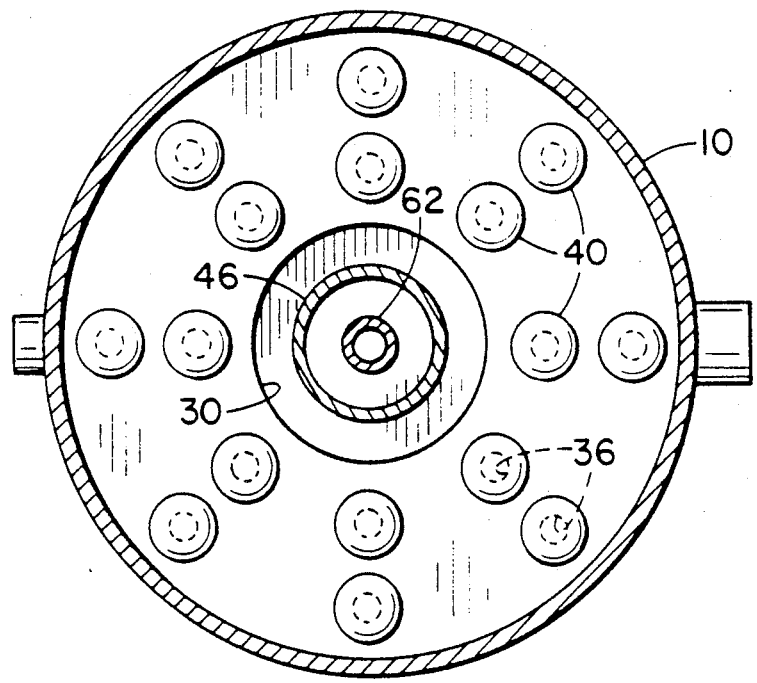
FIG. 5 is a cross-sectional view taken along the line 5—5 of FIG. 4 showing the interior details of the system.
Figure 6:
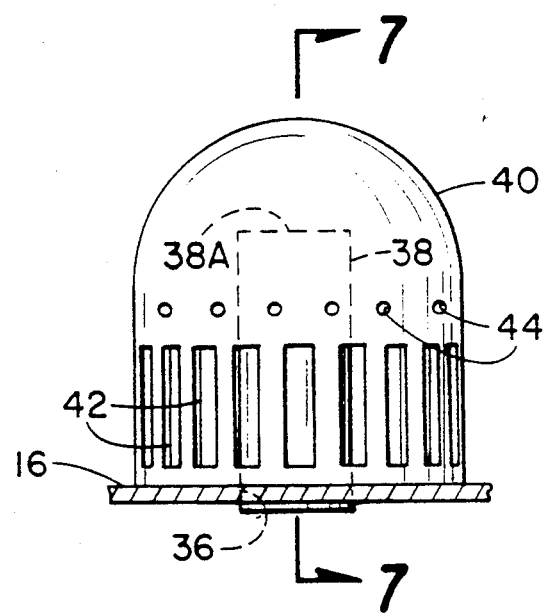
FIG. 6 is an enlarged elevational view of a bubble cap of the type employed in the absorber and as seen in FIGS. 1, 2, 4, and 5.
Figure 7:
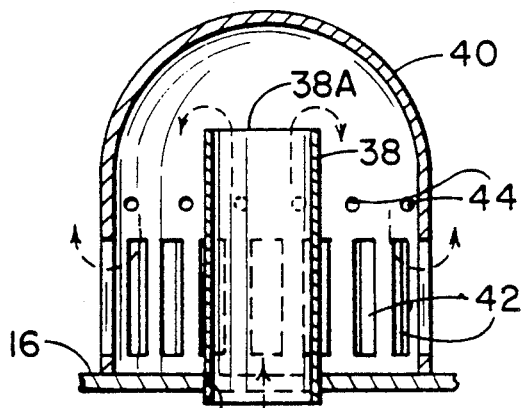
FIG. 7 is a cross-sectional view taken along the line 7—7 of FIG. 6 showing the tubular riser extending from the partition and the bubble cap covering the tubular riser.

The horizontal partition 16 has a plurality of small diameter openings 36 spaced away from collection bucket 30, openings 36 being seen in dotted outline in FIGS. 2 and 5. As shown in FIGS. 6 and 7, positioned within each of the small diameter openings 36 is a short length vertical tubular riser 38. Each tubular riser is welded to partition 16 at each of openings 36.

Positioned over the top of each of the short length tubular risers 38 is a bubble cap 40. The internal diameter of each of the bubble caps 40 is greater than the external diameter of tubular risers 38, leaving an annular area within bubble cap 40. Each of the bubble caps is secured, such as by welding, at its lower end to horizontal partition 16.

Formed in each of the bubble caps, below the upper end 38A of each of the short length tubular risers, are a plurality of passageways 42. The passageways are illustrated as elongated vertical slots, although the configuration of the passageways can vary.

In addition, formed in each of bubble caps 40, above passageways 42 and below the upper end 38A of tubular riser 38 are a plurality of small diameter openings 44. The small diameter openings 44 are arrayed in a plane parallel to horizontal partition 16. The function of passageways 42 and small diameter openings 44 will be described subsequently.

Referring back to FIG. 1, supported within vessel 10 is an upright tubular riser 46. The lower end 46A of the riser extends within collection bucket 30 with the lower end spaced above the bucket floor 32. Riser 46 is preferably centrally located within vessel 10 and when vessel 10 is cylindrical, riser 46 is preferably coaxial with the vessel wall. The upper end 46B of the riser is open and communicates with the upper portion of treatment zone 18. In the illustrated arrangement, the upper end of riser 46 includes a reduced diameter portion 48.

A substantial portion of the vessel treating zone 18 is filled with packing 50. In FIG. 1 only a small portion of the packing is shown so as not to obscure other features of the absorber. To maintain the packing in position within the vessel and to augment distribution of liquid desiccant, a screen 52 horizontally extends within the interior of the vessel and is spaced above partition 16. Screen 52 allows liquid desiccant and gas to freely pass therethrough.

Extending within the vessel treating zone 18 is a desiccant distributor 54 that is in the form of a circular pipe having small diameter openings in the bottom. Distributor 54 is connected to desiccant inlet 26. Anhydrous desiccant passes into the vessel through distributor pipe 54 to flow downwardly onto screen 52 and then trickles downwardly through packing 50 where it is contacted by gas moving upwardly through the packing. In FIG. 1 the path of liquid desiccant is indicated by solid arrows, and the path of gas is indicated by dotted arrows. Riser 46 has an opening 56 intermediate the upper and lower ends thereof. Connected to the interior of the riser through opening 56 is a desiccant circulation conduit 58. The desiccant circulation conduit 58 extends partially exteriorly of vessel 10. Conduit 58 communicates between the interior of riser 46 and the vessel collection zone 20.

The physical features of the absorber of FIGS. 1, 2, 3, 6 and 7 having been described, the method of operation will now be set forth.

Liquid desiccant is introduced into the vessel through distributor 54, trickles downwardly through screen 52 and packing 50 and meets gas moving in the opposite direction, as indicated by the dotted arrows. Gas, having water entrained therein, enters the vessel collection zone 20 through gas inlet 22. The gas passes upwardly through the plurality of short length tubular risers 38 extending upwardly from the horizontal partition 16. The gas flows within bubble caps 40 and out through passageways 42 and small diameter openings 44. The gas migrates upwardly through packing wherein it intimately contacts the downwardly migrating liquid desiccant which absorbs water from the gas. The gas passes through screen 52 into the upper portion of the vessel treating zone 18 and then through a demister 60 where any entrained droplets of desiccant are intercepted. The dry gas passes out of the vessel through gas outlet 24.

As the liquid desiccant flows downwardly through packing 50 it accumulates in the collection bucket 30 and rises within riser 46. When the level of glycol within riser 46 reaches opening 56 the glycol flows through desiccant circulation conduit 58 into the vessel collection zone 20. The spent desiccant, having water entrained therein, is removed from the collection zone through desiccant outlet 28.

The small diameter openings 44 in bubble caps 40 provide gas outlet during minimal flow conditions, whereas during high flow conditions gas passes through the bubble caps 40 both through the smaller diameter openings 44 as well as the much larger passageways 42. During minimal gas flow conditions, the smaller diameter openings 44 provide a means of ensuring maximum contact between the in flowing gas and the liquid desiccant.

Figure 4:
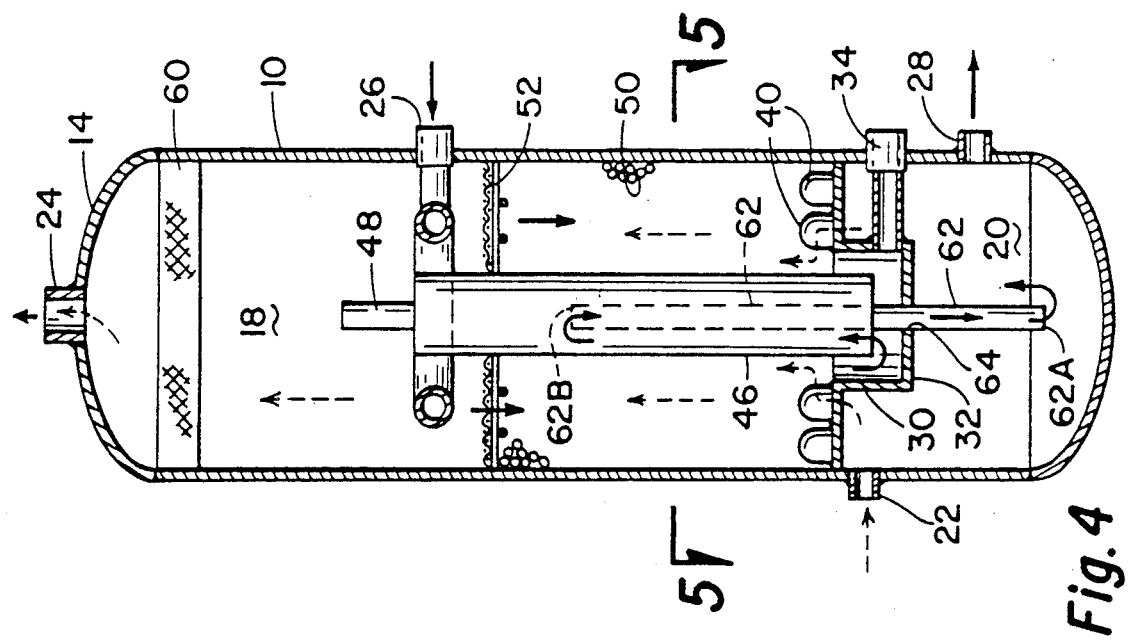
FIG. 4 is an elevational cross-sectional view of the improved absorber showing an alternate embodiment for desiccant circulation within the absorber. In the embodiment of FIG. 4 the desiccant circulation conduit system is entirely within the interior of the vessel.

Referring now to FIGS. 4 and 5, an alternate embodiment of the invention is illustrated. All features of the embodiment of FIGS. 4 and 5 are the same as those described with reference to FIG. 1 except for the desiccant circulation system. In FIGS. 4 and 5, rather than using a desiccant circulation conduit that extends partially exteriorly of the vessel as in FIG. 1, a vertical desiccant circulation conduit 62 is employed. The vertical conduit 62 is positioned coaxially of riser 46 and is received in an opening 64 in the collection bucket floor 32. The lower end 62A of the vertical desiccant circulation conduit extends into the lower portion of the vessel collection zone 20, and the upper end 62B is open and is at an elevation intermediate the upper and lower ends of the riser 46. The upper end 62B of the desiccant circulation conduit is at substantially the same elevation as the intermediate opening 56 in riser 46 as illustrated in FIG. 1.

Figure 3:
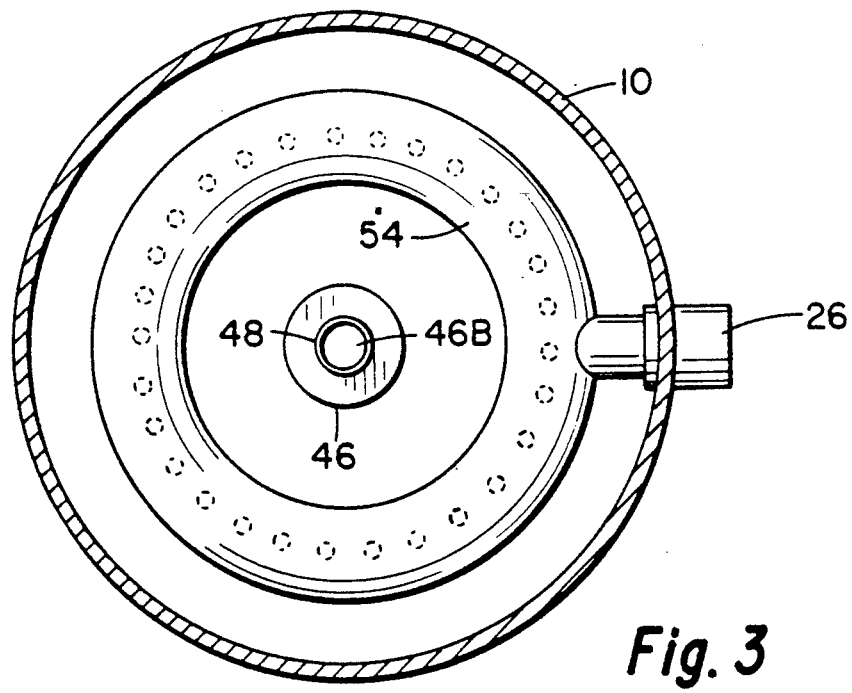
FIG. 3 is a cross-sectional view taken along the line 3—3 of FIG. 1 showing the desiccant distributor in the upper portion of the upper zone and showing the top of the riser.

The embodiment of FIGS. 4 and 5 functions the same as described with reference to the embodiment of FIGS. 1, 2, and 3 except that the desiccant circulation conduit is entirely internally of the vessel. As desiccant rises within riser 46 out of collection bucket 30, it enters the open top 62B of the vertical desiccant circulation conduit and flows downwardly in the conduit into vessel collection zone 20. Spent desiccant is removed through desiccant outlet 28 in the same manner as described with reference to FIG. 1.

During normal flow conditions the level of liquid desiccant within the vessel is determined, with respect to FIG. 1, by the elevation of opening 56 and riser 46, whereas in the embodiment of FIG. 4 it is determined by the elevation of the vertical desiccant circulation conduit upper end 62B.

Figure 8:
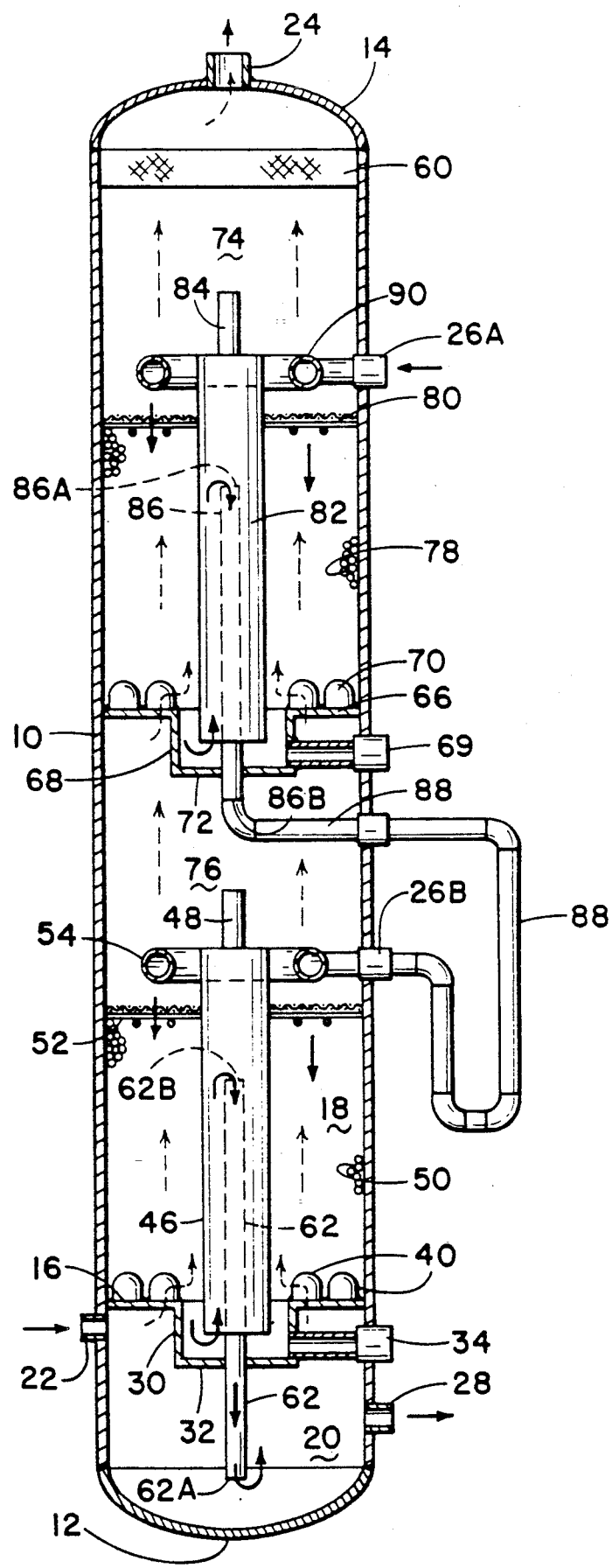
FIG. 8 is an elevational cross-sectional view of an alternate embodiment of the improved absorber wherein the vessel has two horizontal partitions dividing it into first and second treating zones and first and second collection zones in vertical tandem arrangement.

FIG. 8 shows an alternate embodiment of the invention. In essence FIG. 8 utilizes a tandem arrangement of the embodiment of FIGS. 4 and 5. The numbers identifying elements in FIG. 8 identify corresponding elements in FIGS. 4 and 5. In the embodiment of FIG. 8 a second horizontal partition plate 66 is employed positioned elevationaly above the first horizontal partition plate 16. The second partition plate 66 is identical to that of the first horizontal plate 16 and a downwardly extending cross-sectional view of such plate would appear the same as in FIG. 5. Second horizontal plate 66 has a collection bucket 68 formed as a part thereof with a clean-out conduit 69. Plate 66 has openings therein with short length tubular members (not seen in FIG. 8) the same as shown in FIG. 7 and with bubble caps 70 which are in all respect like bubble caps 40 of FIGS. 4, 5, 6 and 7. Collection bucket 68 has a floor 72.

Formed above the second horizontal partition plate 66 is a second treating zone 74 and below partition plate 66 is a second collection zone 76. The second collection zone 76 is above and could be considered the upper portion of the first treating zone 18.

Packing 78 is retained in the lower portion of second treating zone 74 by the second horizontal partition plate 66 and by a screen 80. A second riser 82 is vertically positioned within the second treating zone 74, the lower end of which is received within collection bucket 68. The upper end of riser 82 is above screen 80 and terminates with a reduced diameter portion 84.

Received within riser 82 is a second vertical desiccant conduit 86 having an upper end 86A which is positioned intermediate the length of second riser 82. The lower end 86B of the vertical desiccant circulation conduit receives piping 88 which extends exteriorly of vessel 10. Piping 88 is configured in the U-shape exterior of the vessel and reenters the vessel to connect to desiccant distributor 54.

Positioned in the upper portion of the second treating zone 74 is a second desiccant distributor 90 which receives the flow of anhydrous desiccant, such as anhydrous glycol, into the absorber.

The absorber of FIG. 8 functions essentially as has been described with reference to the absorber 54 except in tandem arrangement. That is, the absorber system of FIG. 4 is substantially duplicated in vertical arrangement within the same vessel. Gas having water entrained therein enters the vessel at gas inlet 22 and flows upwardly through first partition plate 16, through packing 50 in treating zone 18, and past screen 52. The upward migration of the gas is indicated by the dashed arrows in FIG. 8. The upward flow of gas through the first treating zone 18 contacts downwardly flowing gylcol by which water is absorbed therefrom. Gas continues to flow upwardly through the second horizontal partition plate 66, out through bubble caps 70, through packing 78 contained in the second treating zone 74 where the gas further contacts downwardly descending glycol. Any water remaining in the gas is absorbed by the glycol in the second treating zone. The gas passes ultimately through demister 60 and out through the gas outlet 24.

The desiccant inlet is designated as 26A in FIG. 8. Anhydrous desiccant enters the vessel at this point and is distributed by the second desiccant distributor 90. The liquid desiccant flows downwardly past screen 80 and through packing 78. The liquid desiccant collects in bucket 68 formed in the second horizontal partition plate 66. The liquid desiccant flows upwardly within second riser 82 as indicated by the solid arrows. The desiccant enters the upper end 86A of the second desiccant circulation conduit 86 and flows downwardly therethrough into piping 88. The liquid desiccant passes out of the vessel and through the U-shaped piping 88 exterior of the vessel. The liquid desiccant flows back into the interior of the vessel at a second desiccant inlet 26B and into the first desiccant distributor 54. The desiccant from distributor 54 flows downwardly through packing 58 into bucket 30, upwardly within the first riser 46 into the top 62B of the vertical desiccant circulation conduit 62 and out the lower end thereof into collection zone 20. The desiccant having water absorbed therein flows out of the vessel through desiccant outlet 28.

The piping 88 is in a U-shaped configuration exterior of the vessel to form a fluid trap to thereby prevent the passage of gas from the second collection zone 76 into the second treating zone 74 by way of piping 88. In other words, liquid desiccant collects within the U-shaped trap formed by piping 88 to form a gas block to ensure that gas passes in the vessel in the manner indicated by the dotted arrows to be fully contacted by downwardly descending liquid desiccant.

The embodiment of FIG. 8 is employed when a high degree of gas dehydration is required or when circumstances require an absorber which can absorb water from gas over widely varying flow rates.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved absorber for contacting gas having water entrained therein with a liquid desiccant, comprising:
    an upright vessel having a generally horizontal partition therein dividing the vessel interior into a treating zone and, below that, a collection zone, the vessel having a gas inlet and a desiccant outlet in the collection zone, a gas outlet in the treating portion of the treating zone and a desiccant inlet in the treating zone, the horizontal partition having a collection bucket means therein providing a reservoir below the level of the partition, the partition having a plurality of small diameter openings therein spaced from the collection bucket;
    an upright tubular riser positioned within said vessel having an opening in the bottom and in the top, the bottom of the riser extending within said collection bucket;
    a desiccant circulation conduit connecting the interior of the upper portion of said riser with said vessel collection zone;
    packing within said treating zone; and
    desiccant distribution means above said treating zone connected to receive the flow of liquid desiccant therethrough, liquid desiccant passing downwardly through said packing into said collection bucket and upwardly within said riser and by said desiccant circulation conduit into said collection zone and out through said desiccant outlet, gas passing upwardly from said collection zone through said small diameter openings in said partition and upwardly through said packing to thereby contact desiccant passing downwardly through said packing, at least a substantial portion of water in the gas being absorbed by the liquid desiccant.

2. An improved absorber according to claim 1 wherein said opening in the top of said riser is above said desiccant distribution means.

3. An improved absorber according to claim 1 wherein said riser has an intermediate opening therein and wherein said desiccant circulation conduit is connected to said intermediate opening.

4. An improved absorber according to claim 3 wherein said desiccant circulation conduit extends at least partially exteriorly of said vessel.

5. An improved absorber according to claim 1 including:
- a short length vertical tubular member supported in each of said small diameter openings in said partition and extending generally vertically upward from said partition;
- a bubble cap covering each of said tubular members, the internal diameter of each bubble cap being greater than the external diameter of said tubular member, each bubble cap having passageways therein below the upper ends of said tubular members.

6. An improved absorber according to claim 5 wherein each said bubble cap has an open bottom secured to said partition and a closed top and said spaced apart passageways adjacent the cap bottom, and having, above the spaced apart passageways, a plurality of smaller diameter openings arrayed at substantially equal elevation above said partition, the array of small diameter openings serving to influence the depth of desiccant within said cap, said openings being below the upper ends of said tubular members.

7. An improved absorber according to claim 1 wherein said partition has an opening therein and wherein said desiccant circulation conduit extends through such opening and communicates the upper interior portion of said riser with said vessel collection zone.

8. An improved absorber according to claim 7 wherein said opening in said partition is in said collection bucket and said desiccant circulation conduit extends through such opening and within said riser.

9. An improved absorber according to claim 8 wherein said desiccant circulation conduit is substantially vertical and is received substantially co-axially within said riser and has an upper end positioned within the upper portion of said riser and a lower end positioned within the lower portion of said vessel collection zone.

10. An improved absorber according to claim 1 including a second generally horizontal partition spaced above said horizontal partition dividing the vessel interior into a second treating zone and, below that and above said treating zone, a second collection zone, and including a second desiccant distribution means within said second treating zone, the second horizontal partition having a collection bucket means therein providing a reservoir below the level of the second partition, the second partition having a plurality of small diameter openings therein spaced from the collection bucket;
- a second upright tubular riser positioned within said vessel having an opening in the bottom and in the top, the bottom of the second riser extending within said collection bucket in said second partition;
- packing within said second treating zone;
- a second desiccant circulation conduit connecting the interior of the upper portion of said second riser with said desiccant distribution means, whereby liquid desiccant passes downwardly through said packing in said second treating zone into said collection bucket in said second partition and upwardly within said second riser and by said second desiccant circulation conduit into said desiccant distribution means, then downwardly through said treating zone into said collection bucket in said partition for ultimate discharge through said desiccant outlet.

11. An improved absorber according to claim 10 wherein said opening in the top of said second riser is above said second desiccant distribution means.

12. An improved absorber according to claim 10 wherein said second desiccant circulation conduit extends at least partially exteriorly of said vessel.

13. An improved absorber according to claim 10 including:
- a short length vertical tubular member supported in each of said small diameter openings in said second partition and extending generally vertically upward from said second partition;
- a bubble cap covering each of said tubular members extending upwardly from said second partition, the internal diameter of each such bubble cap being greater than the external diameter of said tubular member, each bubble cap having passageways therein below the upper ends of said tubular members.

14. An improved absorber according to claim 13 wherein each said bubble cap has an open bottom secured to said second partition and a closed top and said spaced apart passageways adjacent the cap bottom, and having, above the spaced apart passageways, a plurality of smaller diameter openings arrayed at substantially equal elevation above said second partition, the array of small diameter openings serving to influence the depth of desiccant within said cap, said openings being below the upper ends of said tubular members.

15. An improved absorber according to claim 10 wherein said second partition has an opening therein and wherein said second desiccant circulation conduit extends through such opening and communicates the upper interior portion of said second riser with said vessel second collection zone.

16. An improved absorber according to claim 15 wherein said opening in said second partition is in said collection bucket therein and said second desiccant circulation conduit extends through such opening and within said second riser.

17. An improved absorber according to claim 16 wherein said second desiccant circulation conduit is substantially vertical and is received substantially co-axially within said second riser and has an upper end positioned within the upper portion of said second riser and a lower end positioned within the lower portion of said vessel second collection zone.

* * * * *

UNITED STATES PATENT AND TRADEMARK OFFICE
CERTIFICATE OF CORRECTION

PATENT NO. : 5,116,393
DATED : May 26, 1992
INVENTOR(S) : Harold O. Ebeling

It is certified that error appears in the above-indentified patent and that said Letters Patent is hereby corrected as shown below:

In the abstract:

Next to the last line    change "cllection" to --collection--.

Signed and Sealed this

Third Day of August, 1993

Attest:

MICHAEL K. KIRK

Attesting Officer    Acting Commissioner of Patents and Trademarks